United States Patent
Lipke

(10) Patent No.: US 9,428,371 B2
(45) Date of Patent: Aug. 30, 2016

(54) SYSTEMS AND METHODS FOR CONTROLLING ROPE

(71) Applicant: Conterra, Inc., Bellingham, WA (US)

(72) Inventor: Rick Lipke, Bellingham, WA (US)

(73) Assignee: Conterra, Inc., Bellingham, WA (US)

( * ) Notice: Subject to any disclaimer, the term of this patent is extended or adjusted under 35 U.S.C. 154(b) by 0 days.

(21) Appl. No.: 14/918,374

(22) Filed: Oct. 20, 2015

(65) Prior Publication Data

US 2016/0039645 A1   Feb. 11, 2016

Related U.S. Application Data

(63) Continuation of application No. 13/953,637, filed on Jul. 29, 2013, now Pat. No. 9,162,086, which is a continuation of application No. 13/004,777, filed on Jan. 11, 2011, now Pat. No. 8,495,800, which is a (Continued)

(51) Int. Cl.
*A62B 1/06* (2006.01)
*B66D 3/00* (2006.01)
*A63B 29/02* (2006.01)

(Continued)

(52) U.S. Cl.
CPC .  *B66D 3/00* (2013.01); *A62B 1/06* (2013.01); *A63B 29/02* (2013.01); *F16G 11/14* (2013.01); *F16H 55/32* (2013.01); *Y10T 24/39* (2015.01); *Y10T 24/3916* (2015.01); *Y10T 24/3924* (2015.01)

(58) Field of Classification Search
CPC .......... A62B 1/06; A63B 29/02; B66D 3/00; F16G 11/14; F16H 55/32; Y10T 24/39; Y10T 24/3916; Y10T 24/3924
See application file for complete search history.

(56) References Cited

U.S. PATENT DOCUMENTS

| 285,603 A | 9/1883 | Fell |
| D26,071 S | 9/1896 | Howland et al. |
| 785,019 A | 3/1905 | Parker |

(Continued)

FOREIGN PATENT DOCUMENTS

| JP | 38028861 Y | 12/1963 |
| JP | 48110391 U | 12/1973 |
| JP | 2006345948 A | 12/2006 |

OTHER PUBLICATIONS

Conterra, "Hyper II Brake Rack", predates Dec. 5, 2006, 1 page. cited by applicant.

(Continued)

*Primary Examiner* — Robert J Sandy
*Assistant Examiner* — David Upchurch
(74) *Attorney, Agent, or Firm* — Michael R. Schacht; Schacht Law Office, Inc.

(57) ABSTRACT

A device for controlling movement of a rope has a main part and a bar. The main part defines a central opening, first and second side portions, first and second end portions, first and second pairs of projection portions extending from the first and second end portions, respectively, a first notch defined by the first pair of projection portions, and at least a first end friction surface formed at a juncture of one projection portion of the first pair of projection portions and the first end portion. The bar defines a bar notch. The first side portion pivotably supports the bar for rotation between a first position in which the bar is not in contact the second side portion and a second position in which the bar notch receives the second side portion.

20 Claims, 11 Drawing Sheets

Related U.S. Application Data continuation-in-part of application No. 12/689,912, filed on Jan. 19, 2010, now Pat. No. 7,866,634, which is a continuation of application No. 11/999,274, filed on Dec. 4, 2007, now Pat. No. 7,648,126.

(60) Provisional application No. 60/873,230, filed on Dec. 5, 2006.

(51) Int. Cl.
*F16G 11/14* (2006.01)
*F16H 55/32* (2006.01)

(56) References Cited

U.S. PATENT DOCUMENTS

| | | | |
|---|---|---|---|
| 3,217,840 | A | 11/1965 | Holkesvick |
| 3,656,745 | A | 4/1972 | Holkesvick |
| 3,678,543 | A | 7/1972 | Hobbs |
| 3,695,397 | A | 10/1972 | Hobbs |
| 3,757,901 | A | 9/1973 | Hobbs |
| 3,930,288 | A | 1/1976 | Black |
| 4,311,218 | A | 1/1982 | Steffen |
| D289,373 | S | 4/1987 | Kimball |
| 4,678,059 | A | 7/1987 | Bowker |
| 4,687,077 | A | 8/1987 | Bobick |
| 4,723,634 | A | 2/1988 | Fisk |
| 4,774,742 | A | 10/1988 | Johnson |
| 5,145,036 | A | 9/1992 | Omalia |
| 5,217,092 | A | 6/1993 | Potter |
| 5,295,559 | A | 3/1994 | Nutkins |
| 5,467,845 | A | 11/1995 | Scruggs |
| 5,511,291 | A | 4/1996 | Crawford |
| D376,095 | S | 12/1996 | Curtis |
| 5,671,822 | A | 9/1997 | Phillips |
| 5,803,209 | A | 9/1998 | Suzaki |
| 6,062,340 | A | 5/2000 | Walker |
| 6,095,282 | A | 8/2000 | Sadeck |
| 6,131,697 | A | 10/2000 | Bassett |
| 6,510,599 | B2 | 1/2003 | AmRhein |
| 6,814,185 | B1 | 11/2004 | Ostrobrod |
| 6,962,238 | B1 | 11/2005 | Ostrobrod |
| 8,495,800 | B2 | 7/2013 | Lipke |

OTHER PUBLICATIONS

EPO, European Search Report 07254704.5, Sep. 15, 2010, 7 pages. cited by applicant.
Kong, "Italian Device", predates Dec. 5, 2006, 1 page. cited by applicant.
National Park Service, Technical Rescue Handbook, 11th Edition, 1995-2014, Part 1, 155 pages.
National Park Service, Technical Rescue Handbook, 11th Edition, 1995-2014, Part 2, 137 pages.
SLO, Response to Office Action U.S. Appl. No. 12/689,912, Sep. 9, 2010, 9 pages. cited by applicant.
USPTO, Issue Fee Transmittal U.S. Appl. No. 12/689,912, Dec. 9, 2010, 1 page. cited by applicant.
USPTO, Notice of Allowance U.S. Appl. No. 12/689,912, Sep. 27, 2010, 8 pages. cited by applicant.
USPTO, Office Action U.S. Appl. No. 12/689,912, Jun. 9, 2010, 10 pages. cited by applicant.

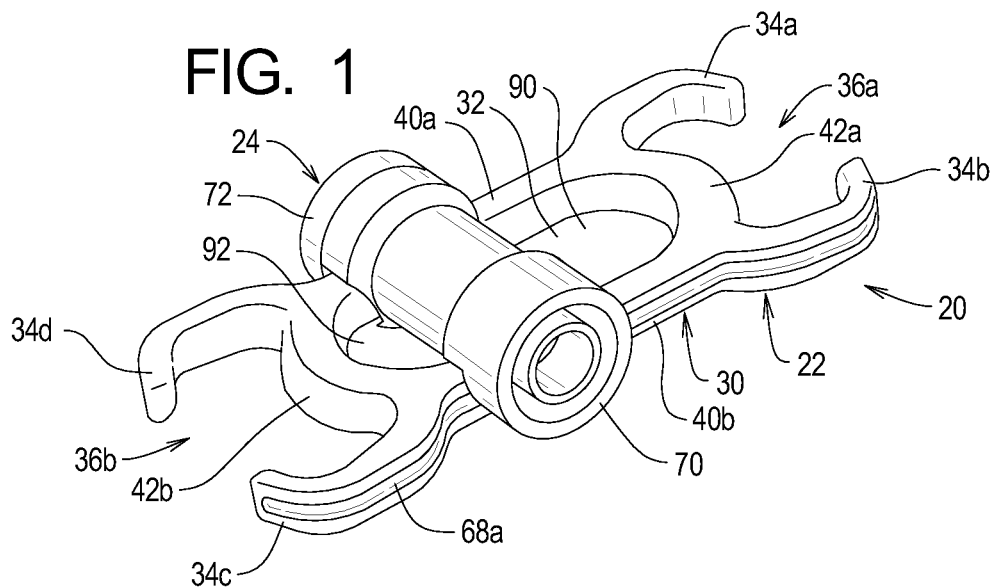
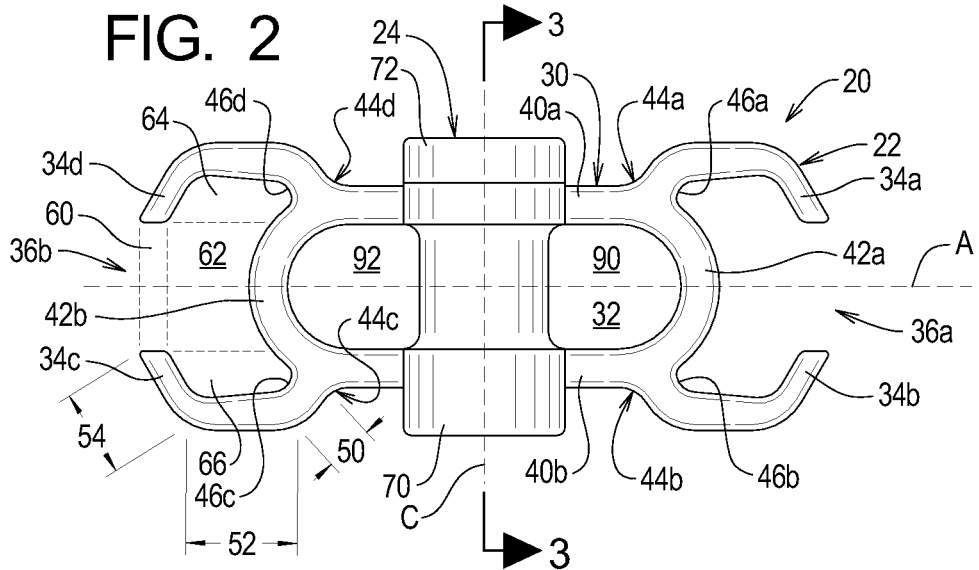

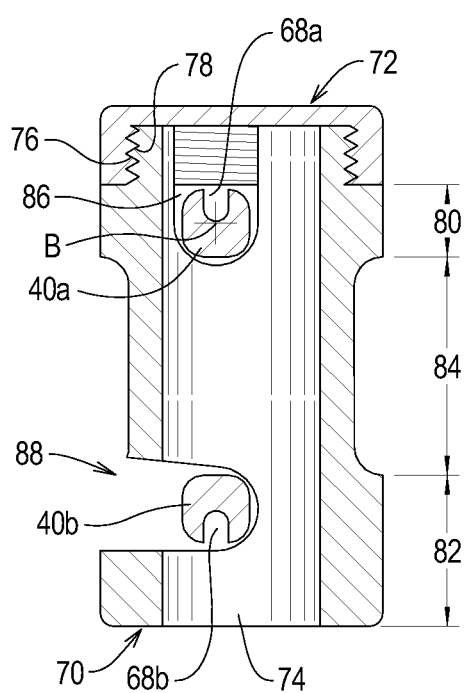
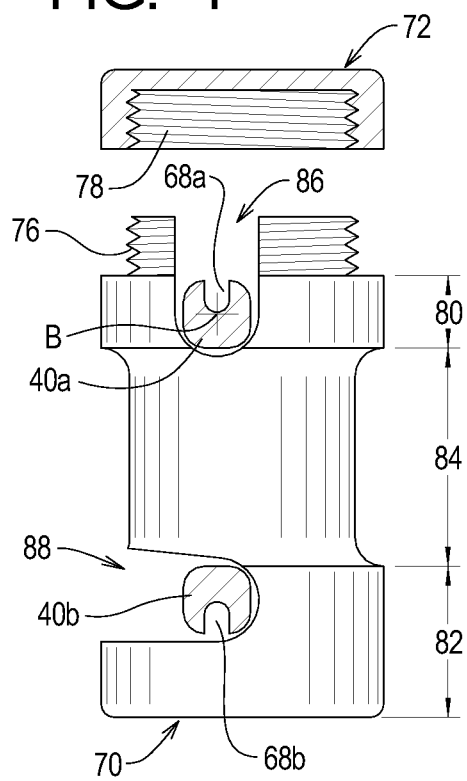
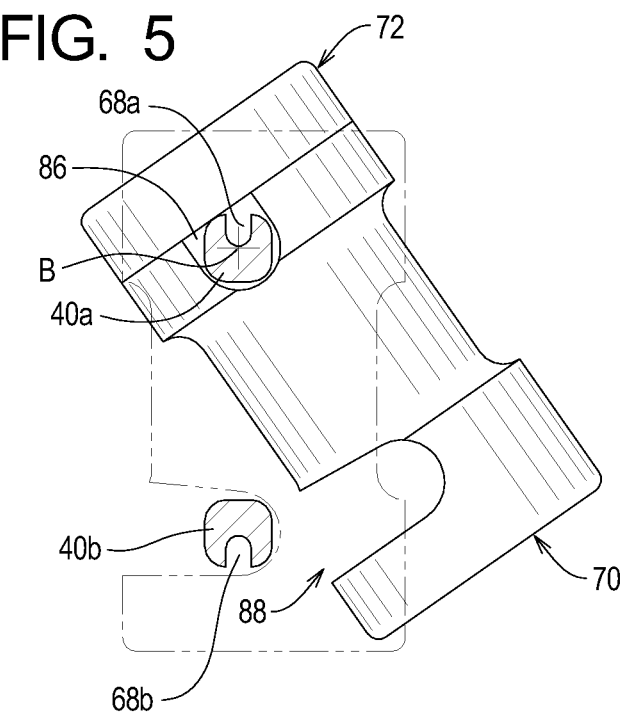

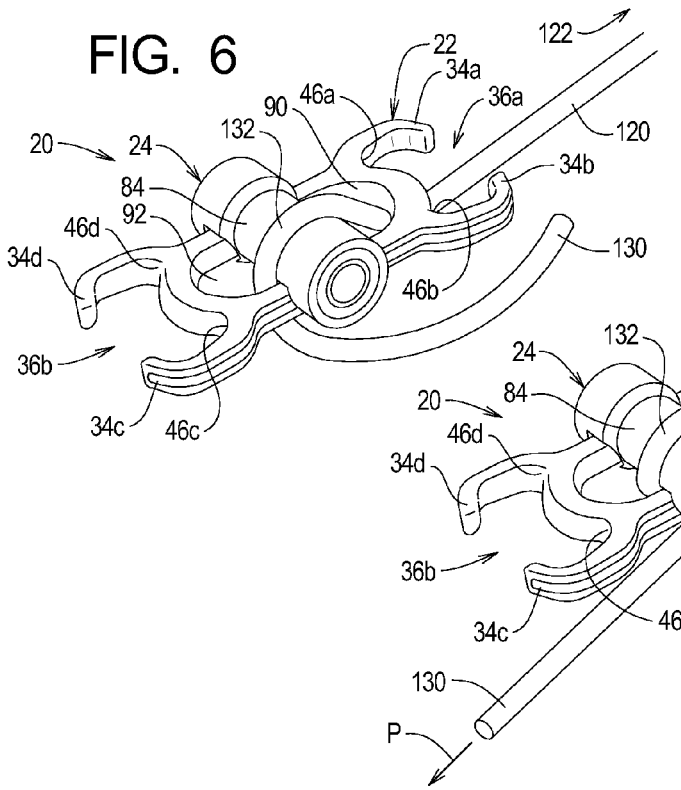
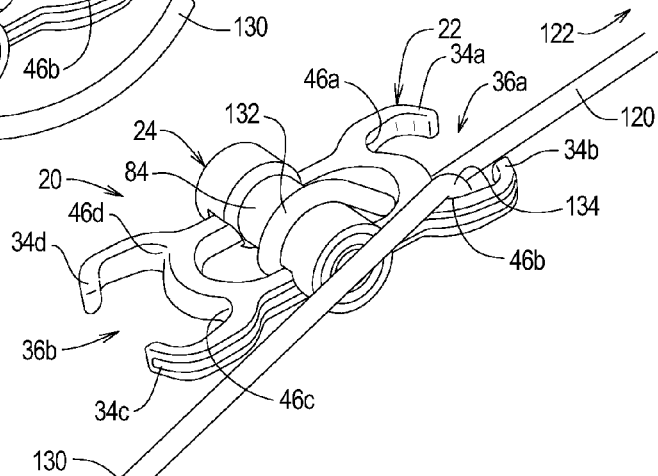
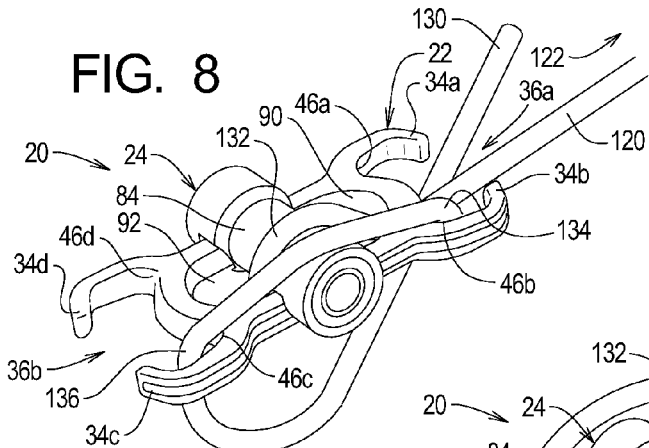

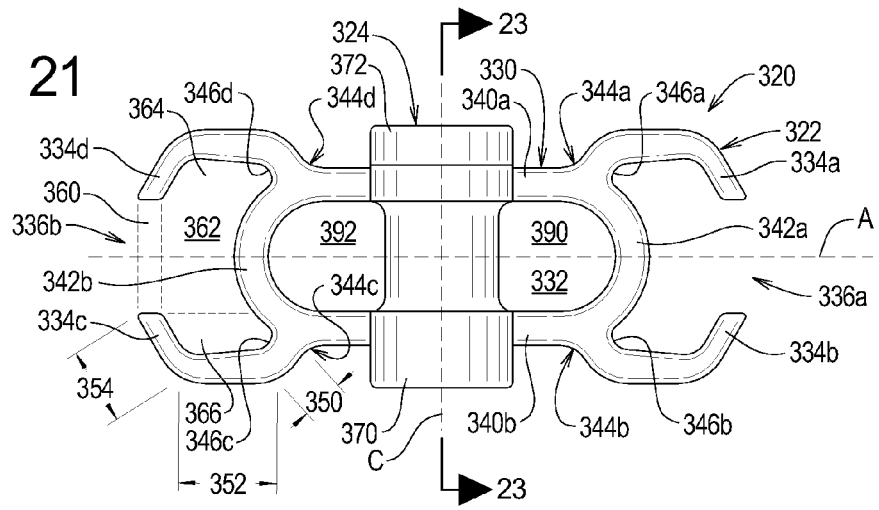
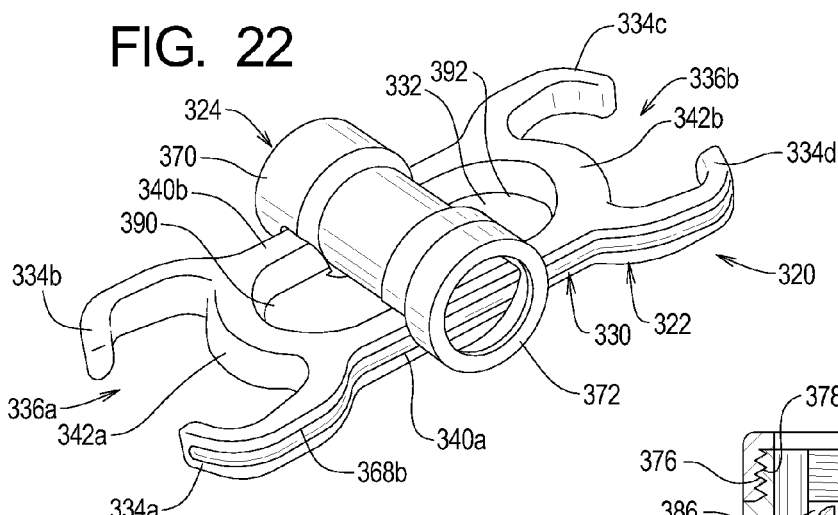
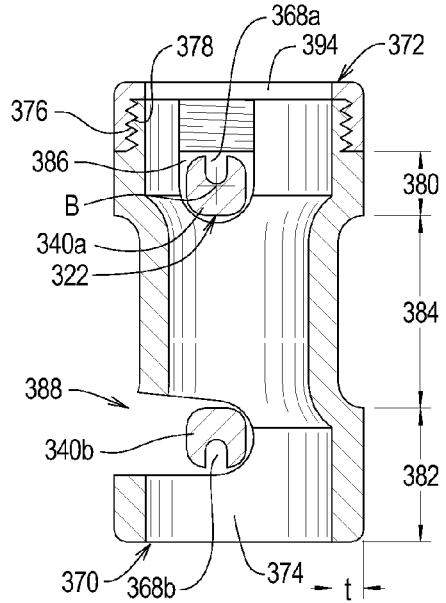

SYSTEMS AND METHODS FOR CONTROLLING ROPE

RELATED APPLICATIONS

This application, is a continuation of U.S. patent application Ser. No. 13/953,639, currently pending.

U.S. patent application Ser. No. 13/953,639 filed Jul. 29, 2013 is a continuation of U.S. patent application Ser. No. 13/004,777 filed Jan. 11, 2011, now U.S. Pat. No. 8,495,800 which issued on Jul. 30, 2013.

U.S. patent application Ser. No. 13/004,777 is a continuation-in-part of U.S. patent application Ser. No. 12/689,912 filed Jan. 19, 2010, now U.S. Pat. No. 7,866,634 which issued on Jan. 11, 2011.

U.S. patent application Ser. No. 12/689,912 is a continuation of U.S. patent application Ser. No. 11/999,274 filed Dec. 4, 2007, now U.S. Pat. No. 7,648,126 which issued on Jan. 19, 2010.

U.S. patent application Ser. No. 11/999,274 claims benefit of expired U.S. Provisional Patent Application Ser. No. 60/873,230, filed Dec. 5, 2006.

The contents of all related applications listed above are incorporated herein by reference.

TECHNICAL FIELD

The present invention relates to systems and methods for controlling rope and, more particularly, to rope control assemblies that allow rope to be played out under control while under loads.

BACKGROUND

Ropes are an essential part of a wide variety of activities related to health and safety, law enforcement recreation, and construction. In particular, the need often exists for a user to use a rope to control the movement of one object (hereinafter the load) relative to another object (hereinafter the anchor point).

Typically, but not necessarily, the anchor point is a fixed location on a structural member such as a tree, building, or the like, and the load is moved relative to the anchor point. However, the anchor point may be formed on a movable object such as a helicopter or ship. The load can take many different forms such as supplies, equipment, an injured person, and/or, in the case of rappelling, the person using the rope.

The construction and use of general purpose rope rigging devices such as tackle blocks, belay devices, ascenders, carabiners, and pulleys are well-known. In addition, numerous rigging devices have been developed specifically to facilitate the use of ropes to control movement of a load relative to an anchor point.

The need exists for lightweight and reliable rope control devices that may be used easily, flexibly, and in a variety of configurations to control movement of a rope to allow a load to be moved relative to an anchor point.

RELATED ART

The Applicant is aware of the following rope control devices that are currently available in the marketplace.

A product that may be referred to as a "Figure 8 Plate" is a flat plate defining first, second, and third holes arranged in a line in that order from a first end towards a second end along a longitudinal axis. The second hole is the smallest, and the third hole is the largest. First and second rounded lateral projections extend outwardly from each side of the plate adjacent to the third hole. A rope is passed through one or more of the holes and around one or more of the lateral projections to allow movement of the rope to be controlled using friction between the device and the rope.

A class of devices known as "Brake Racks" is also known in the art. These devices generally comprise an external frame formed by a U-shaped piece of metal that defines first and second legs and one or more cross-bars that can be pivoted about the first leg of the frame into a locked or unlocked position relative to the second leg of the frame. One example of a brake rack is sold by the Applicant under the tradename "Conterra Hyper 2."

SUMMARY

The present invention may be embodied as a rope control device for controlling a rope defining a first rope end, a second rope end, and first and second rope portions between the first and second rope ends, the rope control system comprising a main part and a bar. The main part defines a central opening, first and second side portions, first and second end portions, first and second pairs of projection portions extending from the first and second end portions, respectively, a first notch defined by the first pair of projection portions, and at least a first end friction surface formed at a juncture of one projection portion of the first pair of projection portions and the first end portion. The bar defines a bar notch. The first side portion pivotably supports the bar for rotation between a first position in which the bar is not in contact the second side portion and a second position in which the bar notch receives the second side portion. The bar is arranged in the first position to allow the first rope portion to be extended through the central opening and at least partly around the bar. The bar is arranged in the second position such that the main part and the bar define first and second opening portions of the central opening and the first rope portion extends through the first and second opening portions and at least partly around the bar. The second rope portion is passed through the first notch. The second rope portion frictionally engages the first end friction surface when the rope is under tension.

The present invention may also be embodied as a method of controlling movement of rope defining a first rope end, a second rope end, and first and second rope portions between the first and second rope ends, the method comprising the following steps. A main part is provided, the main part defining a central opening, first and second side portions, first and second end portions, first and second pairs of projection portions extending the first and second end portions, respectively, first and second notches formed between the projection portions of the first and second pairs of projection portions, respectively, and a friction surface at junctures of the first and second end portions and each of the first and second pairs of projection portions adjacent extending therefrom. A bar defining a bar opening and a bar notch is provided. The bar is pivotably connected to the first side portion by extending the first side portion through the bar opening. The bar is arranged in a first position in which the bar is not in contact the second side portion to allow the first rope portion to be arranged within the central opening and at least partly around the bar without access to the first and second rope ends. The bar is arranged in a second position in which the bar notch receives the second side portion such that the main part and the bar define first and second opening portions of the central opening the first rope portion extends through the first and second opening portions and at least partly around the bar. The second rope portion is passed through at least one of the first notch and the second notch. The rope is placed under tension such that the second rope portion frictionally engages one of the friction surfaces.

The present invention may also be embodied as a device for controlling movement of a rope comprising a main part, a first bar part, and a second bar part. The main part defines a central opening, first and second side portions, first and second end portions, first and second projection portions extending from each end portion, and a friction surface at junctures of each end portion and the pair of projection portions adjacent extending therefrom. The first bar part defines a bar notch. The second bar part is attached to the first bar part such that the first side portion extends through a bar opening to form a bar assembly is pivotably connected to the first side portion for rotation between a first position in which the bar assembly is not in contact the second side portion and a second position in which the bar notch receives the second side portion. The bar assembly is arranged in the first position to allow a portion of the rope to be arranged within the central opening and at least partly around the bar part. The bar part is arranged in the second position such that the main part and the bar part define first and second opening portions of the central opening and the portion of the rope extends through the first and second opening portions and at least partly around the bar part.

A rope control device for controlling defining a first rope end, a second rope end, and first and second rope portions between the first and second rope ends, the rope control device comprising a main part and a bar. The main part defines a central opening, first and second side portions, first and second end portions, first and second projection portions extending from the first end portion, and third and fourth projection portions extending from the second end portion. The first and second end portions define a first notch. The third and fourth end portions define a second notch. The first, second, third, and fourth friction surfaces formed at junctures of the first end portion with the first projection portion, the first end portion with the second projection portion, the second end portion with the third projection portion, and the second end portion with the fourth projection portion, respectively. The bar comprises a first bar part and a second bar part, where the first bar part defines a bar notch. The second bar part is attached to the first bar part such that the first side portion extends through a bar opening to form the bar and the bar is pivotably connected to the first side portion for rotation between a first position in which the bar is not in contact the second side portion and a second position in which the bar notch receives the second side portion. The bar is arranged in the first position to allow the first rope portion to be passed through the central opening and at least partly around the first bar part. The bar part is arranged in the second position such that the main part and the bar part define first and second opening portions of the central opening and the first rope portion extends through the first and second opening portions and at least partly around the bar part. The second rope portion is passed through one of the first and second notches. The second rope portion frictionally engages at least one of the one of the first, second, third, and fourth end friction surfaces when the rope is under tension.

BRIEF DESCRIPTION OF THE DRAWINGS

FIG. 1 is a perspective view of a first example rope control device of the present invention;

FIG. 2 is a plan view of a second example rope control device of the present invention;

FIG. 3 is a section view taken along lines 3-3 in FIG. 2;

FIG. 4 is a partial section view similar to that of FIG. 3 illustrating the assembly of a bar part relative to a main part to obtain a rope control device as depicted in FIG. 1;

FIG. 5 is a partial section view illustrating movement of bar part relative to the main part of a rope control device as depicted in FIG. 1;

FIGS. 6-12 illustrate a plurality of methods of use of a rope control device as depicted in FIG. 1 to control movement of a rope structure;

FIG. 21 is a top plan view of the third example rope control device of the present invention;

FIG. 22 is a second perspective view of the third example rope control device of the present invention;

FIG. 23 is a section view of the third example rope control device of FIGS. 20-22;

DETAILED DESCRIPTION

Figure 10:
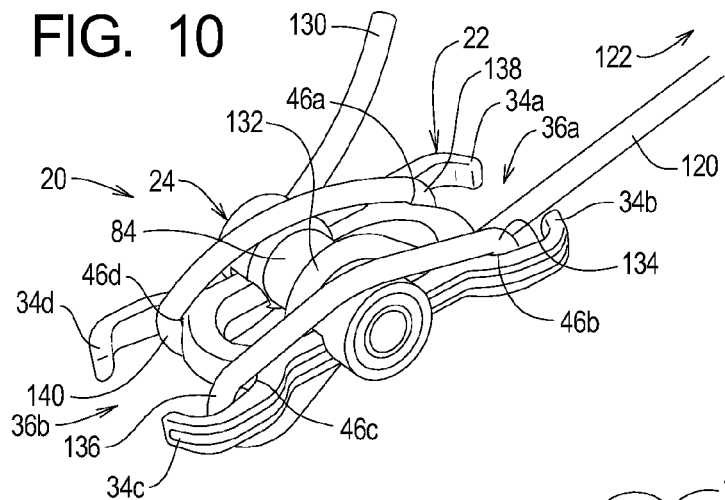

Referring initially to FIG. 1 of the drawing, depicted at 20 therein is a rope control device constructed in accordance with, and embodying, the principles of the present invention. The rope control device 20 is an assembly comprising a main part 22 and a bar part 24. As shown in FIG. 5 of the drawing, the bar part 24 is pivotably connected to the main part 22 for movement into and out of an engaged position (broken lines in FIG. 5).

The example main part 22 is a rigid member comprising a central portion 30 defining a central opening 32. The main part 22 further comprises first, second, third, and fourth projection portions 34a, 34b, 34c, and 34d extending from the central portion 30. The first and second projection portions 34a and 34b define a first end recess 36a, while the third and fourth projection portions 34c and 34d define a second end recess 36b.

The example central portion 30 comprises first and second side portions 40a and 40b and first and second end portions 42a and 42b. The side portions 40a and 40b are generally straight and parallel, and the end portions 42a and 42b form a bridge between the side portions 40a and 40b. The side portions 40a and 40b are joined to the end portions 42a and 42b at first, second, third, and fourth juncture portions 44a, 44b, 44c, and 44d. As shown in FIG. 2, friction surfaces 46a, 46b, 46c, and 46d are formed within the end recesses 36a and 36b at the junctures between the projection portions 34 and the end portions 42a and 42b. The example central portion 30 is symmetrical about a longitudinal axis A (FIG. 2).

The projection portions 34 extend from the central portion 30 at the juncture portions 44, respectively. Each of the projection portions 34 defines a proximal portion 50, an intermediate portion 52, and a distal portion 54. The proximal portions 50 extend away from the juncture portions 44 at an angle with respect to the longitudinal axis A. The intermediate portions 52 extend at an angle relative to the proximal portions 50 and are substantially parallel to the longitudinal axis A. The distal portions 54 extend at an angle relative to the intermediate portions 52 and also at an angle inwards towards the longitudinal axis A.

Each of the end recesses 36 defined by the projection portions 34 defines an inlet portion 60, a main portion 62, and first and second lateral portions 64 and 66. The inlet portions 60 extend between tips of the distal portions 54 of projection portions 34, while the main portions 62 are located between the inlet portions 60 and the end portions 42 of the central portion 30. The lateral portions 64 and 66 of the end recesses 36 are formed on either side of the main portion 62 and are bounded on three sides by the projection portions 34. The friction surfaces 46 lie within the lateral portions 64 or 66 of the end recesses 36.

In the example rope control device 20, inner surfaces of the intermediate portions 52 are in line with outer surfaces of the side portions 40 of the central portion 30 of the main part 22. The example distal portions 54, the lateral portions 64 or 66 of the end recesses 36, and the friction surfaces 46 are along a line spaced from and parallel the axis A. The distal portions 54 thus extend over the friction surfaces 46 when the main part 22 is viewed along the longitudinal axis A.

In addition, the friction surfaces 46 are curved towards the lateral portions 64 or 66. The radius of curvature of the example friction surfaces 46 is not constant, and the friction surfaces 46 generally take the form of a V-shape.

As shown for example in FIGS. 3-5, the basic shape of the cross-sectional area of the main part 22 is rectangular or square with rounded corners. However, as perhaps best shown in FIGS. 1 and 3-5, flutes or grooves 68a and 68b are formed along at least part of the example main part 22. In particular, FIG. 1 illustrates that the example flute 68a extends along surfaces of the second side portion 40b and the second and third projection portions 34b and 34c. The groove 68b (not visible in FIG. 1) similarly extends along the first side portion 40a and the first and fourth projection portions 34a and 34d.

Referring again to FIGS. 3-5, the example grooves 68a and 68b extend approximately to the center of the first and second side portions 40a and 40b. The grooves 68a and 68b should remove a first range of approximately 12-20% of the cross-sectional area of at least a portion of the part 22 or a second range of approximately 10-25% of the cross-sectional area of a least a portion of the part 22. The example grooves 68a and 68b remove approximately 16% of the cross-sectional area of each of the first, second, third, and fourth projection portions 34a, 34b, 34c, and 34d and the first and second side portions 40a and 40b of the part 22. The example grooves 68a and 68b are also formed on outward facing surfaces of the projection portions 34a, 34b, 34c, and 34d and the side portions 40a and 40b of the part 22.

The flutes or grooves 68 reduce the weight of the part 22. In particular, the grooves 68 should be sized and dimensioned to reduce the weight of the part 22 without compromising the ability of the part 22 to withstand the loads to which it will be subjected. Additionally, as will be described in further detail below, the part is designed to be used in conjunction with a rope. Friction between such a rope and the part 22 can cause heat to build up within the part 22. This stored heat can degrade the function of the rope under certain circumstances. The example flutes or grooves 68 facilitate the dissipation of heat energy stored within the part 22 by increasing the surface area of the part 22 that is exposed to ambient air. Also, the example flutes or grooves 68 are formed on surfaces of the part 22 that are not likely to come into contact with the rope, thereby reducing the likelihood that the part 22 will abrade the rope.

As perhaps best shown in FIG. 4, the example bar part 24 is an assembly comprising a bar member 70 and a cap member 72. The bar member 70 defines a bar chamber 74. A first threaded portion 76 is formed on the bar member 70, and a second threaded portion 78 is formed on the cap member 72. The bar member 70 and cap member 72 are joined together to form the bar part 24 by engagement of the first and second threaded portions 76 and 78.

The bar member 70 defines first and second end surfaces 80 and 82, an intermediate surface 84, and first and second notches 86 and 88. The diameter of the example end surfaces 80 and 82 are slightly larger than that of the intermediate surface 84. The diameter of the example intermediate surface 84 is smaller at its end portions (adjacent to the end surfaces 80 and 82) than at its central portion between its end portions.

The first notch 86 terminates in the first threaded portion 76 such that, when the cap member 72 is secured to the bar member 70, the first notch 86 is closed to define an opening in the bar part 24. The second notch 88 terminates in the second end surface 82 and the intermediate surface 84 and is spaced from the first notch 86 a distance substantially equal to the distance between the side portions 40a and 40b of the central portion of the main part 22.

As shown in FIGS. 3-5, the first side portion 40a is placed in the first notch 86 of the bar member 70 and the cap member 72 is threaded onto the bar member to capture the first side portion 40a within the opening in the bar member 70 defined by the first notch 86. The bar part 24 thus is capable of pivoting relative to the main part 22 about a pivot axis B defined by the first side portion 40a.

When the bar part 24 is in a closed position relative to the main part 22 (FIGS. 1-4 and broken lines in FIG. 5), the second side portion 40b of the main part 22 is received within second notch 88. When the bar part 24 is rotated about the pivot axis B out of the closed position relative to the main part 22 (solid lines in FIG. 5), the second side portion 40b is no longer received within the second notch 88.

When the bar part 24 is in the closed position, the bar part 24 divides the central opening of the main part 22 into first and second opening portions 90 and 92. The bar part 24 may be slid along main part towards and away from the end portions 42a and 42b to change the cross-sectional areas of the opening portions 90 and 92 (e.g., portion 90 has a larger cross-sectional area than portion 90 in FIG. 1).

The main part 22 and bar part 24 may be made of one or more of aluminum, titanium, stainless steel, plastic, composites, and/or combinations thereof. Selection of an appropriate material will be made for a particular market and/or operating environment based on factors such as cost, strength, heat dissipation, wear resistance, corrosion resistance, and weight.

The rope control device 20 may be used in a variety ways to control the playing out of one or more ropes while the rope or ropes are under loads. Referring now to FIGS. 6-11 of the drawing, a number of methods of using the rope control device 20 to control movement of a single primary rope 120 are depicted.

FIGS. 6 and 7 illustrate that control of the rope 120 under light loads may be performed using the rope control device 20 by passing the primary rope 120 through the first and second opening portions 90 and 92 and around the bar part 24. Typically, as shown by the example depicted in FIG. 13, a distal end 122 of the rope 120 is secured to a structural point 124 and a load (not shown) is connected to the rope control device 120 by a clip 126 and fixed rope 128. The connections to the structural point 124 and the load can take forms other than those depicted in FIG. 13.

If a free end 130 of the rope 120 is available, the bar part 24 may be placed or left in the closed position relative to the main part 22 and the free end 130 threaded through the first opening 90, around the bar part 24, and through the second opening 92. If, however, the free end 130 is not adjacent to the rope control device 20, the bar part 24 may be rotated out of the closed position and a first intermediate portion 132 of the rope 120 may be looped around the bar part 24. The bar part 24 may then be rotated back into the closed position to capture the rope 120 within the first and second openings 90 and 92 as shown in FIGS. 6 and 7. When the rope 120 is under loads, the first intermediate portion 132 will be in contact with the intermediate surface 84 of the bar part 24.

When the rope 120 is captured within the first and second openings 90 and 92, a second intermediate portion 134 of the rope 120 may then be placed into the first notch 36a as shown in FIG. 7. When the rope 120 is under loads, the second intermediate portion 134 will be in contact with the second friction surface 46b of the main part 22.

As described above, the friction surfaces 46 are curved towards the lateral portions 64 and 66. The curvature of these surfaces 46 increases the surface area of the main part 22 in contact with the rope 120 and thus the friction between these surfaces 46 and the rope 120. In addition, the general V-shape of the example friction surfaces 46 tends to wedge or pinch the rope between the end portions 42 and the projection portions 34 to further increase friction between the surfaces 46 and the rope 120.

With the rope configured as shown in FIG. 7, pulling the free end 130 in a pull direction (shown by arrow P in FIG. 7) away from the rope control device 20 can move the load connected to the device 20 towards the structural point to which the distal end 122 is connected.

Figure 13:
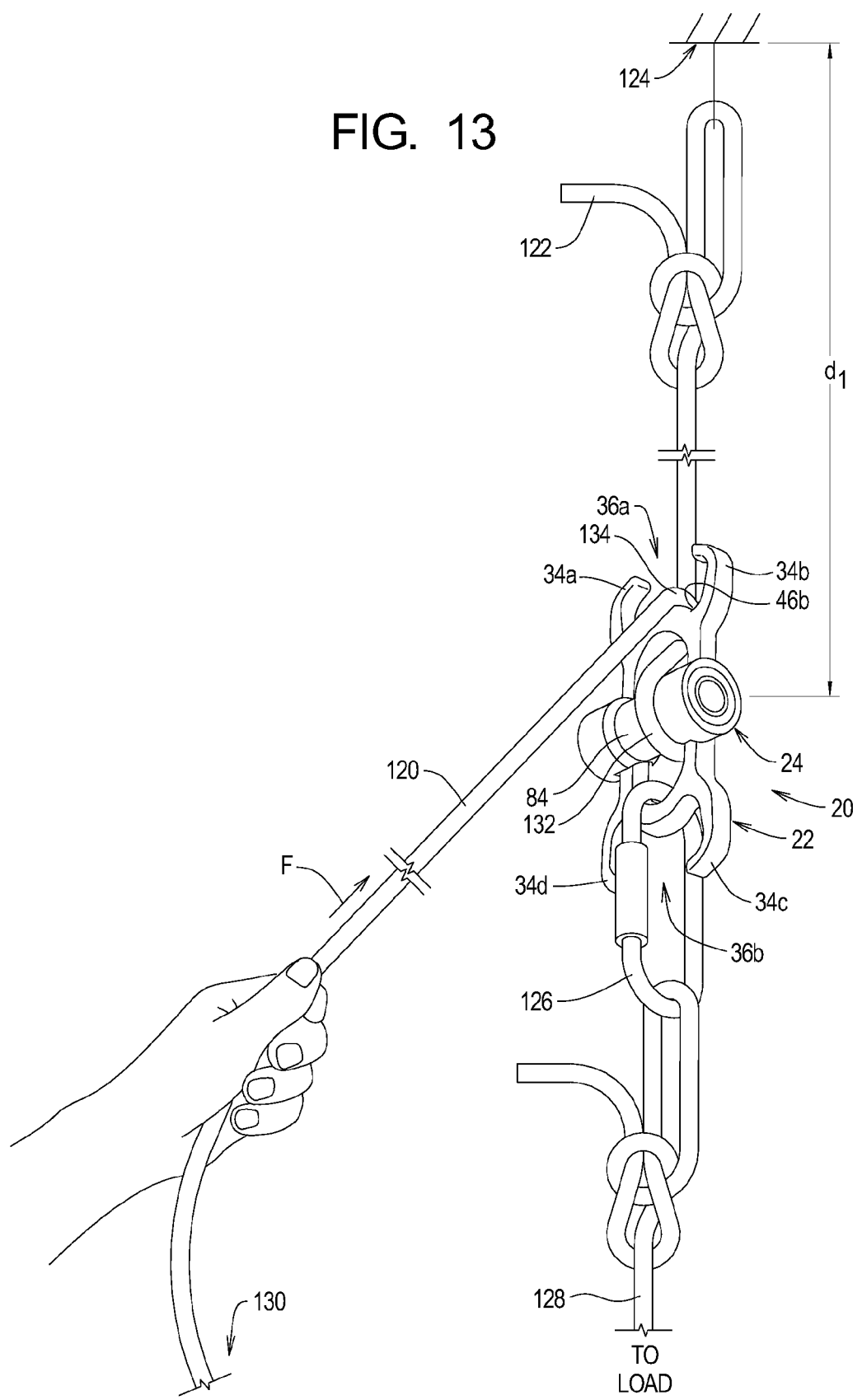
FIGS. 13-14 depict a first use configuration of using a rope control device as depicted in FIG. 1.
Figure 14:
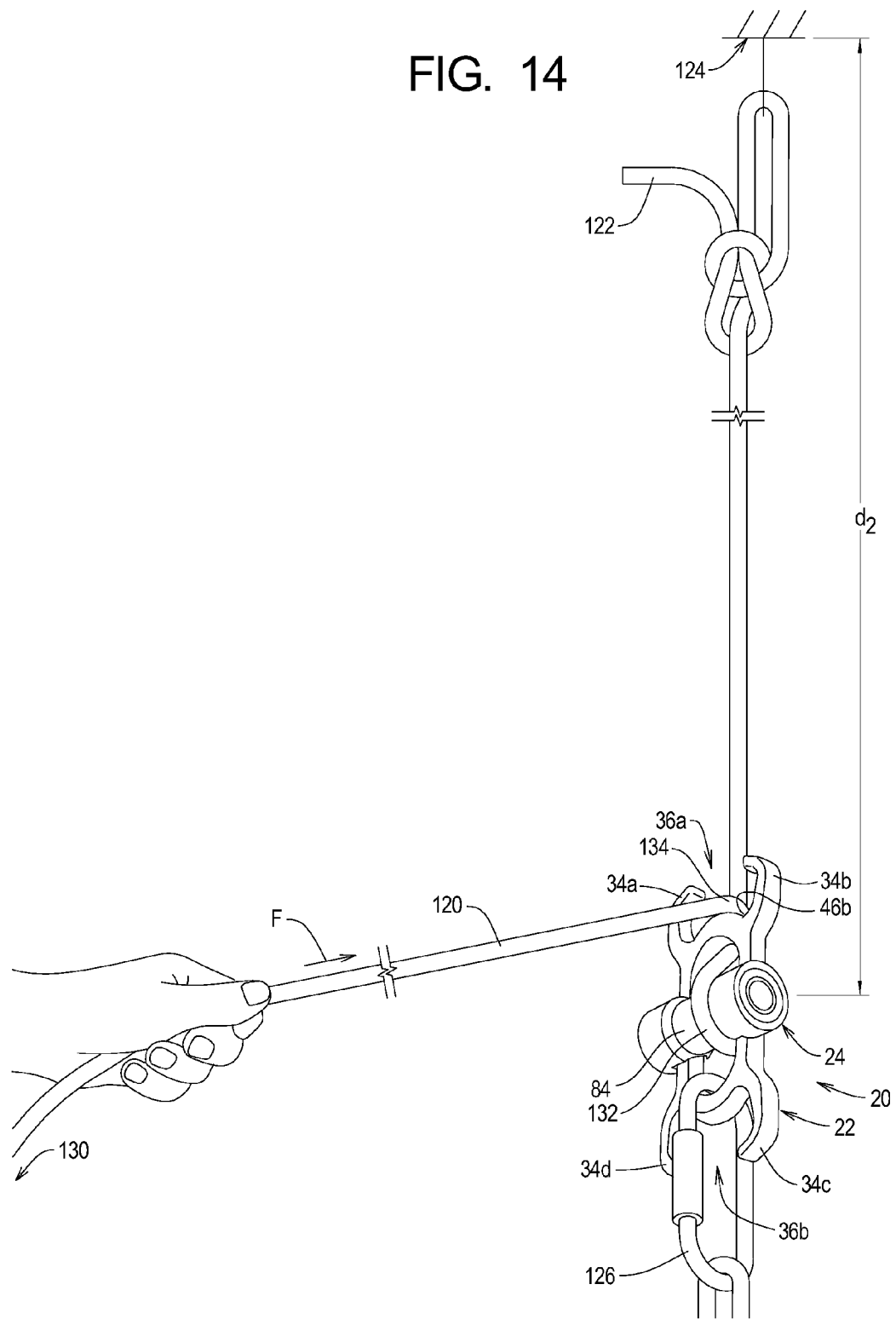

The rope control device 20 will, however, typically be used to allow the load connected to the device 20 to be moved away from the structural point 124 to which the distal end 122 is connected. For example, FIGS. 13 and 14 illustrate the rope 120 being fed in a feed direction indicated by an arrow F (opposite the pull direction) towards the device 20 to increase a distance between the structural point 124 and the rope control device 20 and thus between the structural point 124 and the load. The distance $d_1$ in FIG. 13 is shorter than the distance $d_2$ in FIG. 14 after the rope 120 has been fed in the direction of arrow F relative to the rope control device 20.

Friction between first intermediate portion 132 of the rope 120 and the intermediate surface of the bar part 24 and between the second intermediate portion 134 and the friction surface 46b of the main part 22 facilitates control of movement of the rope 120 relative to the rope control device 20 and thus of movement of the load relative to the structural point.

With larger loads, the friction between the rope 120 and the rope control device 20 when configured as shown in FIG. 7 may be insufficient to allow a user to control movement of the rope 120 relative to the rope control device 20. In this case, a third intermediate portion 136 of the rope 120 may be placed into the second end recess 36b and pulled against the third friction surface 46c as generally shown in FIG. 8.

If the additional friction between the third portion 136 and the third friction surface 46c is still insufficient to control playing out of the rope 120 relative to the device 20, a fourth intermediate portion 138 of the rope 120 may be placed into the first end recess 36a and brought against the first friction surface 46a as shown in FIG. 9.

If the cumulative friction between the rope portions 132, 134, 136, and 138 and the surfaces 84, 46b, 46c, and 46a is still insufficient to control movement of the rope 120 relative to the rope control device 20, a fifth intermediate portion 140 of the rope 120 may be placed into the second end recess 36b and brought into contact with the fourth friction surface 46d as shown in FIG. 10.

Figure 11:
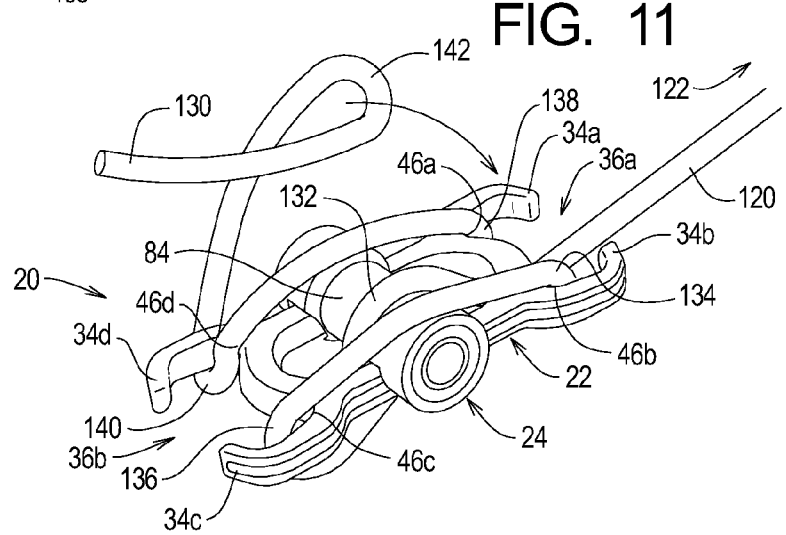

If the relationship of the rope 120 relative to the rope control device 20 must be fixed in any of the positions depicted in FIG. 7, 8, 9, or 10, a twisted loop may be formed in the rope 120 and placed over an opposing one of the projection portions 34. For example, FIG. 11 depicts a sixth intermediate portion 142 being formed into a twisted loop and drawn over the first projection portion 34a to lock the rope 120 relative to the device 20 in the position depicted in FIG. 10.

In any situation in which a portion of the rope 120 in inserted into an end recess 36, the projection portions 34 are configured such that the distal portions 54 thereof inhibit inadvertent removal of the rope portion from the end recess 36. The distal portions 54, which extend over the lateral portions 64 and 66 of the end recesses 36, as described above, engage the rope 120 to require a positive movement of the rope 120 towards the inlet portion 60 of the recesses 36. The configurations of the example projection portions 34 thus facilitate arrangement of the rope portions against the friction surfaces when loads are not applied to the rope to hold the rope portions against the friction surfaces 46.

Figure 12:
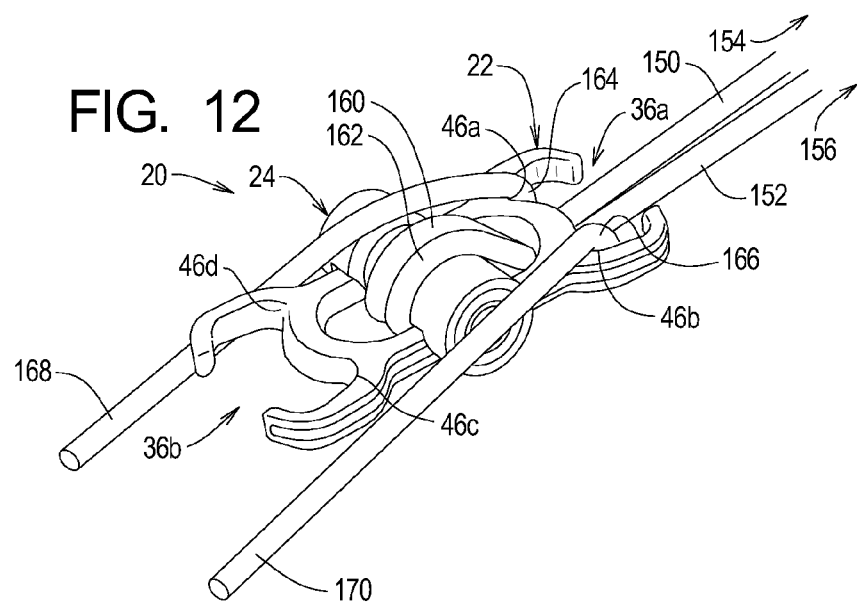

FIG. 12 illustrates the use of the rope control device 20 to control movement of first and second ropes 150 and 152. Again, one or more of distal ends 154 and 156 of the ropes 150 and 152, respectively, are typically fixed to one or more structural points and/or one or more loads. A load may also be connected to the rope control device 20.

First intermediate portions 160 and 162 of the ropes 150 and 152, respectively, are arranged over the bar part 24 as described above with reference to FIG. 6. Second intermediate portions 164 and 166 of the ropes 150 and 152, respectively, are placed into the first end recess 36a and drawn against the first and second friction surfaces 46a and 46b, respectively. The ropes 150 and 152 may be used in tandem to control movement of a load relative to an anchor point by displacing free ends 168 and 170 of the ropes 150 and/or 152 towards or away from the rope control device 20.

Figure 15:
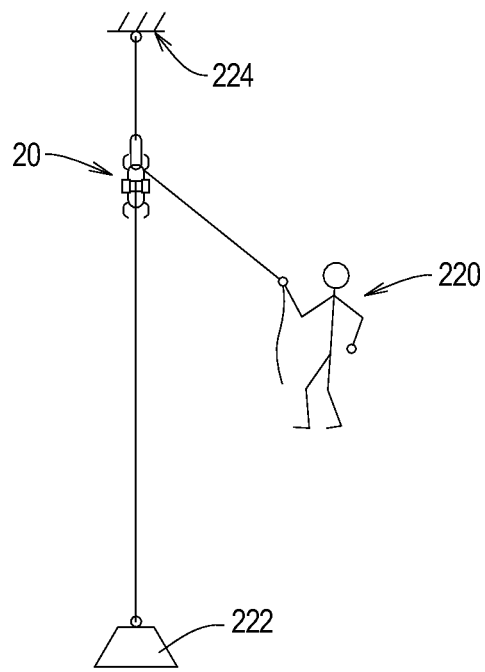
FIG. 15 schematically depicts the first use configuration of using a rope control device as depicted in FIG. 1.
Figure 16:
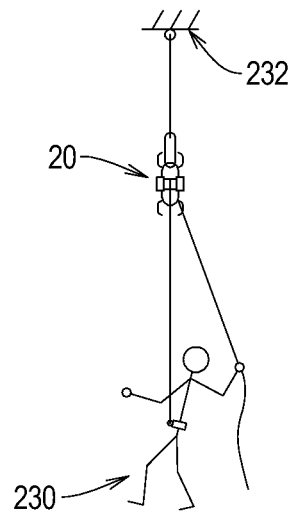
FIG. 16 schematically depicts a second use configuration of using a rope control device as depicted in FIG. 1.
Figure 17:
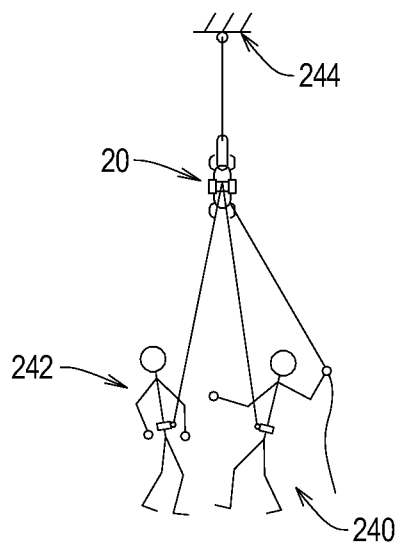
FIG. 17 schematically depicts a third use configuration of using a rope control device as depicted in FIG. 1.
Figure 18:
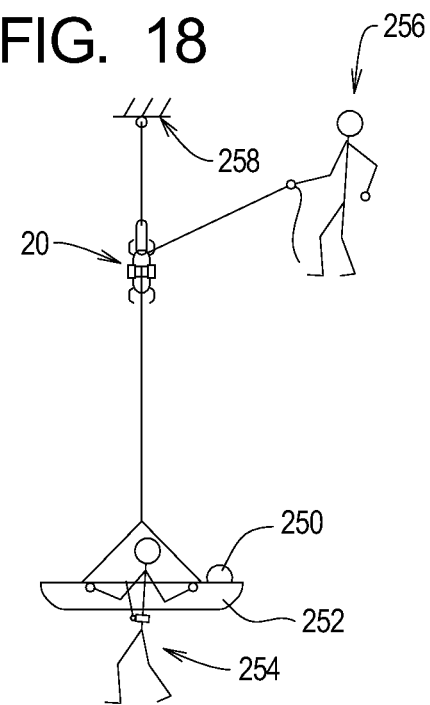
FIG. 18 schematically depicts a fourth use configuration of using a rope control device as depicted in FIG. 1.

FIGS. 15-18 schematically depict a number of environments in which the rope control device 20 may be used. In FIG. 15, a person 220 displaces a load 222 relative to a anchor point 224. In FIG. 16, a person 230 forms the load and displaces him or herself relative to a anchor point 232. In FIG. 17, a first person 240 and a second person 242 form the load, and the first person 240 displaces both the first and second persons 240 and 242 relative to a anchor point 244. In FIG. 18, a first person 250 in a stretcher 252 is attended by a second person 254, and a third person 256 displaces the first and second persons 250 and 254 relative to an anchor point 258.

Figure 19:
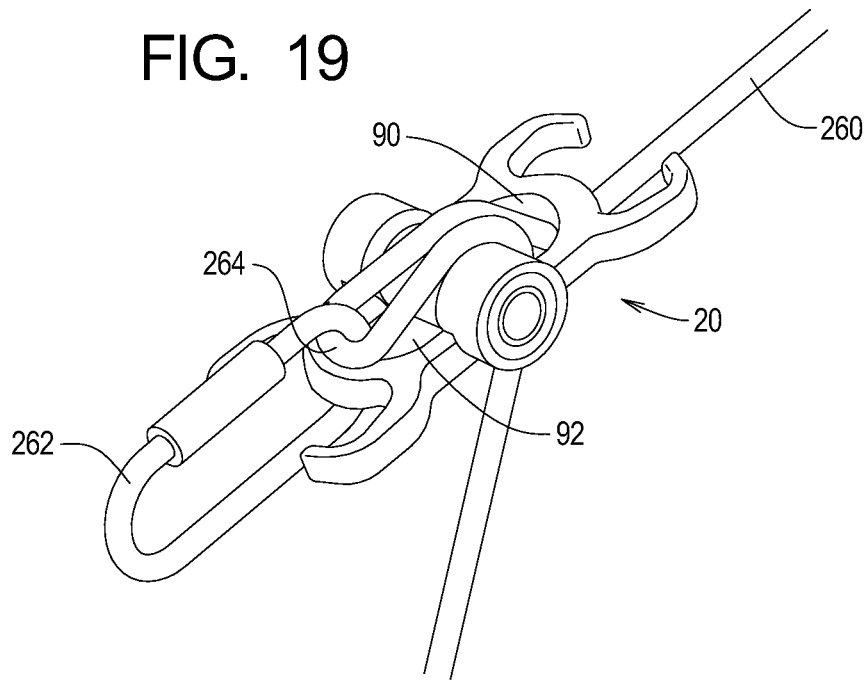
FIG. 19 depicts a fifth use configuration of using a rope control device as depicted in FIG. 1.

The rope control device 20 may be used in configurations other than those described and depicted herein. As one example, depicted in FIG. 19 is a configuration in which a rope 260 is used in conjunction with a clip 262 and the rope control device 20. A loop is formed in a first intermediate portion 264 of the rope 260 and inserted through the first opening 90 defined by the device 20. The loop formed by the first intermediate portion is then retained by the clip 262. The weight of any load applied to the clip 262 thus increases friction between the clip 262 and the portion of the rope in contact with the clip 262.

The example main part 22 of the rope control device 20 is substantially symmetrical about the longitudinal axis A. The main part 22 is further substantially symmetrical about a lateral axis C (FIG. 2) that is perpendicular to the longitudinal axis A and extends through the center of gravity of the main part 22. While the main part 22 need not be symmetrical within the broader teachings of the present invention, a symmetrical main part 22 as described herein allows the rope control device 20 to be used without regard to end to end orientation.

Further, although FIGS. 6-19 depict certain example uses of the example rope control device 20, the rope control device 20 can be used in other configurations. For example, instead of fixing one end of the rope to the anchor point and the rope control device 20 to the load, the end of the rope can be fixed relative to the load and the rope control device can be fixed relative to the anchor point.

Figure 20:
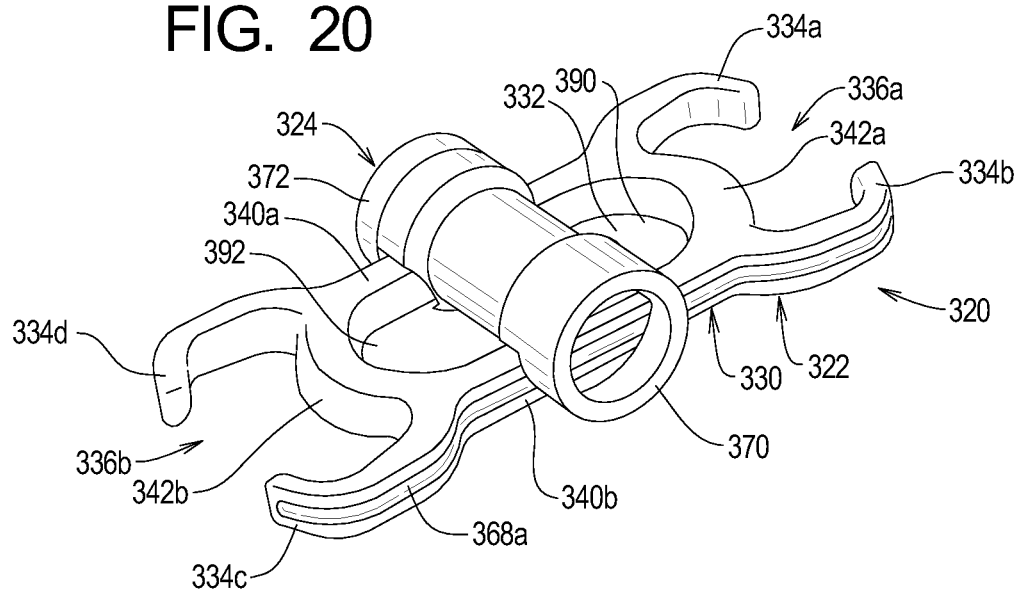
FIG. 20 is a first perspective view of a third example rope control device of the present invention.

Referring now to FIG. 20 of the drawing, depicted at 320 therein is a third example rope control device constructed in accordance with, and embodying, the principles of the present invention. The example rope control device 320 is an assembly comprising a main part 322 and a bar part 324. As with the example rope control device 20 described above, the bar part 324 is pivotably connected to the main part 322 for movement into and out of an engaged position.

The example main part 322 is a rigid member comprising a central portion 330 defining a central opening 332. The main part 322 further comprises first, second, third, and fourth projection portions 334a, 334b, 334c, and 334d extending from the central portion 330. The first and second projection portions 334a and 34b define a first end recess 336a, while the third and fourth projection portions 334c and 334d define a second end recess 336b.

As perhaps best shown in FIG. 21, the example central portion 330 comprises first and second side portions 340a and 340b and first and second end portions 342a and 342b. The side portions 340a and 340b are generally straight and parallel, and the end portions 342a and 342b form a bridge between the side portions 340a and 340b. The side portions 340a and 340b are joined to the end portions 342a and 342b at first, second, third, and fourth juncture portions 344a, 344b, 344c, and 344d.

FIG. 21 further illustrates that friction surfaces 346a, 346b, 346c, and 346d are formed within the end recesses 336a and 336b at the junctures between the projection portions 334 associated with the end recesses 336a and 336b and the end portions 342a and 342b. As with the example central portion 30 described above, the example central portion 330 is symmetrical about a longitudinal axis A.

The projection portions 334 extend from the central portion 330 at the juncture portions 344, respectively. Each of the projection portions 334 defines a proximal portion 350, an intermediate portion 352, and a distal portion 354. The proximal portions 350 extend away from the juncture portions 344 at an angle with respect to the longitudinal axis A. The intermediate portions 352 extend at an angle relative to the proximal portions 350 and are substantially parallel to the longitudinal axis A. The distal portions 354 extend at an angle relative to the intermediate portions 352 and also at an angle inwards towards the longitudinal axis A.

Each of the end recesses 336a, 336b defined by the adjacent pairs 334a, 334b and 334c, 344d of projection portions, respectively, defines an inlet portion 360, a main portion 362, and first and second lateral portions 364 and 366. The inlet portions 360 extend between tips of the distal portions 354 of projection portions 334, while the main portions 362 are located between the inlet portions 360 and the end portions 342 of the central portion 330. The lateral portions 364 and 366 of the end recesses 336 are formed on either side of the main portion 362 and are bounded on three sides by the projection portions 334. The friction surfaces 346 lie within the lateral portions 364 or 366 of the end recesses 336.

In the example rope control device 320, inner surfaces of the intermediate portions 352 are substantially in line with outer surfaces of the side portions 340 of the central portion 330 of the main part 322. The example distal portions 354, the lateral portions 364 or 366 of the end recesses 336, and the friction surfaces 346 are substantially along a line spaced from and parallel to the axis A. The distal portions 354 thus extend over the friction surfaces 346 when the main part 322 is viewed along the longitudinal axis A.

In addition, the friction surfaces 346 are curved towards the lateral portions 364 or 366. The radius of curvature of the example friction surfaces 346 is not constant, and the friction surfaces 346 generally take the form of a V-shape.

As shown for example in FIG. 23, the basic shape of the cross-sectional area of the main part 22 is rectangular or square with rounded corners. However, FIG. 23 shows that flutes or grooves 368a and 368b are formed along at least part of the example main part 22. In particular, as with the example rope control device 20, the example flute 368a extends along surfaces of the second side portion 340b and the second and third projection portions 334b and 334c. The groove 368b similarly extends along the first side portion 340a and the first and fourth projection portions 334a and 334d.

As shown in FIG. 23, the example grooves 368a and 368b extend approximately to the center of the first and second side portions 340a and 340b. The grooves 368a and 368b should remove a first range of approximately 12-20% of the cross-sectional area of at least a portion of the part 322 or a second range of approximately 10-25% of the cross-sectional area of at least a portion of the part 322. The example grooves 368a and 368b remove approximately 316% of the cross-sectional area of each of the first, second, third, and fourth projection portions 334a, 334b, 334c, and 334d and the first and second side portions 340a and 340b of the part 322. The example grooves 368a and 368b are also formed on outward facing surfaces of the projection portions 334a, 334b, 334c, and 334d and the side portions 340a and 340b of the part 322.

The flutes or grooves 368 reduce the weight of the part 322. In particular, the grooves 368 should be sized and dimensioned to reduce the weight of the part 322 without compromising the ability of the part 322 to withstand the loads to which it will be subjected. Additionally, as will be described in further detail below, the part is designed to be used in conjunction with a rope. Friction between such a rope and the part 322 can cause heat to build up within the part 322. This stored heat can degrade the function of the rope under certain circumstances. The example flutes or grooves 368 facilitate the dissipation of heat energy stored within the part 322 by increasing the surface area of the part 322 that is exposed to ambient air. Also, the example flutes or grooves 368 are formed on surfaces of the part 322 that are not likely to come into contact with the rope, thereby reducing the likelihood that the part 322 will abrade the rope.

As perhaps best shown in FIG. 23, the example bar part 324 is an assembly comprising a bar member 370 and a cap member 372. The bar part 324 may, however, be formed using a single part that is deformed and/or welded or braised to engage the side portion 340*a* as generally described herein. The bar part 32 may also be formed of two pieces that are welded or braised together to form a single part that engages the side portion 340*a* as described herein.

The example bar member 370 defines a bar chamber 374. FIG. 23 illustrates that a thickness t of the example bar member 370 is substantially uniform. This thickness t is determined to allow the bar part 324 to perform the structural functions necessary for proper operation of the rope control device 320. However, the thickness of the bar member 370 should be minimized to minimize overall weight of the device 320. Additionally, minimizing the thickness t of the bar member 370 facilitates dissipation of heat within the bar part 324 during use of the rope control device 320.

A first threaded portion 376 is formed on the bar member 370, and a second threaded portion 378 is formed on the cap member 372. The bar member 370 and cap member 372 are joined together to form the bar part 324 by engagement of the first and second threaded portions 376 and 378.

The bar member 370 defines first and second end surfaces 380 and 382, an intermediate surface 384, and first and second notches 386 and 388. The diameter of the example end surfaces 380 and 382 are slightly larger than that of the intermediate surface 384. The diameter of the example intermediate surface 384 is smaller at its end portions (adjacent to the end surfaces 380 and 382) than at its central portion between its end portions.

The first notch 386 terminates in the first threaded portion 376 such that, when the cap member 372 is secured to the bar member 370, the first notch 386 is closed to define an opening in the bar part 324. The second notch 388 terminates in the second end surface 382 and the intermediate surface 384 and is spaced from the first notch 386 a distance substantially equal to the distance between the side portions 340*a* and 340*b* of the central portion of the main part 322.

The example rope control device 320 is used in a manner similar to that of the example rope control device 20 described above. In particular, the first side portion 340*a* is placed in the first notch 386 of the bar member 370 and the cap member 372 is threaded onto the bar member to capture the first side portion 340*a* within the opening in the bar member 370 defined by the first notch 386. The bar part 324 thus is capable of pivoting relative to the main part 322 about a pivot axis B (FIG. 23) defined by the first side portion 340*a*.

When the bar part 324 is in a closed position relative to the main part 322, the second side portion 340*b* of the main part 322 is received within second notch 388. When the bar part 324 is rotated about the pivot axis B out of the closed position relative to the main part 322, the second side portion 340*b* is no longer received within the second notch 388.

When the bar part 324 is in the closed position, the bar part 324 divides the central opening of the main part 322 into first and second opening portions 390 and 392. The bar part 324 may be slid along the main part towards and away from the end portions 342*a* and 342*b* to change the cross-sectional areas of the opening portions 390 and 392.

The cap member 372 of the example rope control device 320 defines a hole or opening 394 as shown in FIGS. 22 and 23. The opening 394 allows air to flow through the bar chamber 374 to facilitate cooling of the bar part 324 during use of the rope control device 320 as described herein. In the example bar part 324, the example opening 394 is substantially circular and has substantially the same diameter as the bar chamber 374 at the end of the bar part 370.

The main part 322 and bar part 324 may be made of one or more of aluminum, titanium, stainless steel, plastic, composites, and/or combinations thereof. Selection of an appropriate material will be made for a particular market and/or operating environment based on factors such as cost, strength, heat dissipation, wear resistance, corrosion resistance, and weight.

As with the rope control device 20 described above, the rope control device 320 may be used in a variety ways to control the playing out of one or more ropes while the rope or ropes are under loads. In particular, the methods depicted in FIGS. 6-11 of the drawing may also be applied to the rope control device 320.

Referring now to FIGS. 24-27 of the drawing, depicted at 420 therein is a rope control device constructed in accordance with, and embodying, the principles of the present invention. The rope control device 420 is an assembly comprising a main part 422 and a bar part 424. Like the bar part 24 described above, the bar part 424 is pivotably connected to the main part 422 for movement into and out of an engaged position.

The example main part 422 is an assembly comprising a central portion 430 defining a central opening 432. The main part 422 further comprises first, second, third, and fourth projection portions 434*a*, 434*b*, 434*c*, and 434*d* extending from the central portion 430. The first and second projection portions 434*a* and 434*b* define a first end recess 436*a*, while the third and fourth projection portions 434*c* and 434*d* define a second end recess 436*b*.

Figure 24:
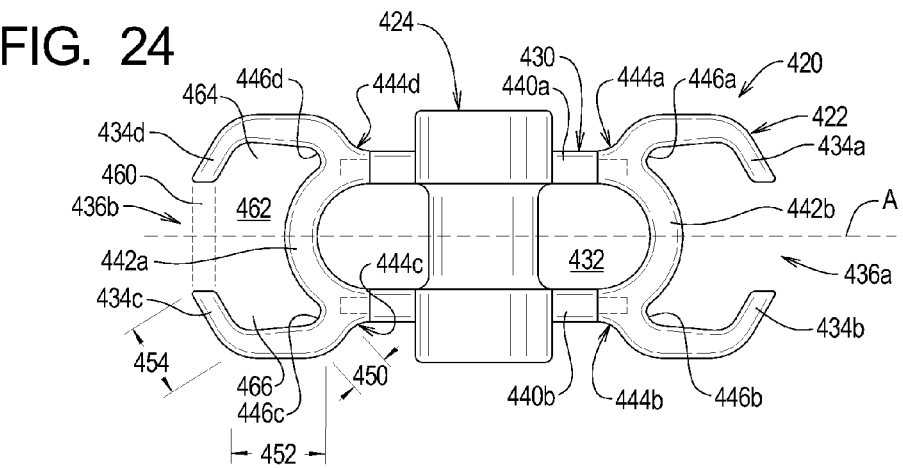
FIG. 24 is a top plan view of a fourth example rope control device of the present invention.

The example central portion 430 comprises first and second side portions 440*a* and 440*b* and first and second end portions 442*a* and 442*b*. The side portions 440*a* and 440*b* are generally straight and parallel, and the end portions 442*a* and 442*b* form a bridge between the side portions 440*a* and 440*b*. The side portions 440*a* and 440*b* are joined to the end portions 442*a* and 442*b* at first, second, third, and fourth juncture portions 444*a*, 444*b*, 444*c*, and 444*d*. As shown in FIG. 24, friction surfaces 446*a*, 446*b*, 446*c*, and 446*d* are formed within the end recesses 436*a* and 436*b* at the junctures between the projection portions 434 and the end portions 442*a* and 442*b*. The example central portion 430 is symmetrical about a longitudinal axis A.

The projection portions 434 extend from the central portion 430 at the juncture portions 444, respectively. Each of the projection portions 434 defines a proximal portion 450, an intermediate portion 452, and a distal portion 454. The proximal portions 450 extend away from the juncture portions 444 at an angle with respect to the longitudinal axis A. The intermediate portions 452 extend at an angle relative to the proximal portions 450 and are substantially parallel to the longitudinal axis A. The distal portions 454 extend at an angle relative to the intermediate portions 452 and also at an angle inwards towards the longitudinal axis A.

Each of the end recesses 436 defined by the projection portions 434 defines an inlet portion 460, a main portion 462, and first and second lateral portions 464 and 466. The inlet portions 460 extend between tips of the distal portions 454 of projection portions 434, while the main portions 462 are located between the inlet portions 460 and the end portions 442 of the central portion 430. The lateral portions 464 and 466 of the end recesses 436 are formed on either side of the main portion 462 and are bounded on three sides by the projection portions 434. The friction surfaces 446 lie within the lateral portions 464 or 466 of the end recesses 436.

In the example rope control device 420, inner surfaces of the intermediate portions 452 are in line with outer surfaces of the side portions 440 of the central portion 430 of the main part 422. The example distal portions 454, the lateral portions 464 or 466 of the end recesses 436, and the friction surfaces 46 are along a line spaced from and parallel to the axis A. The distal portions 454 thus extend over the friction surfaces 46 when the main part 422 is viewed along the longitudinal axis A.

In addition, the friction surfaces 46 are curved towards the lateral portions 464 or 466. The radius of curvature of the example friction surfaces 46 is not constant, and the friction surfaces 46 generally take the form of a V-shape.

Figure 25:
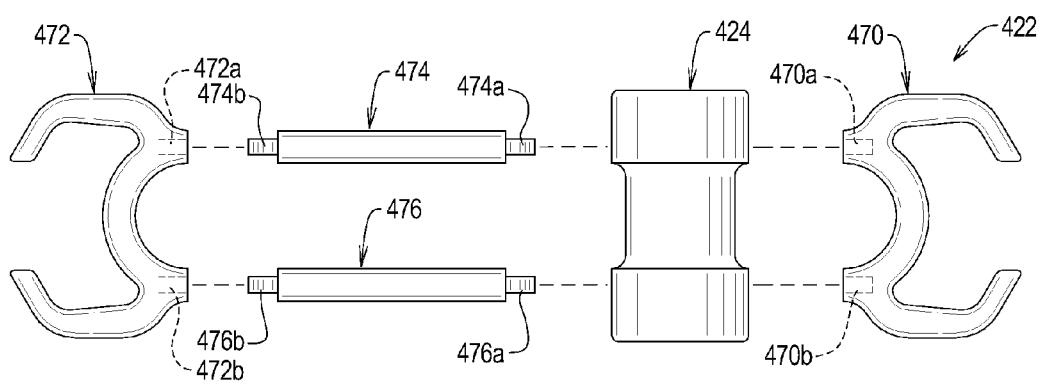
FIG. 25 is an exploded, top plan view of the fourth example rope control device.
Figure 26:
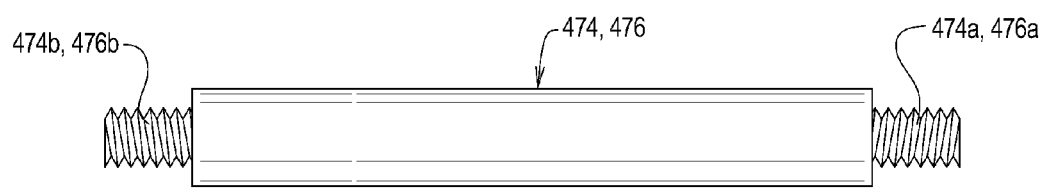
FIG. 26 is an elevation view of a side member of the fourth example rope control device.
Figure 27:
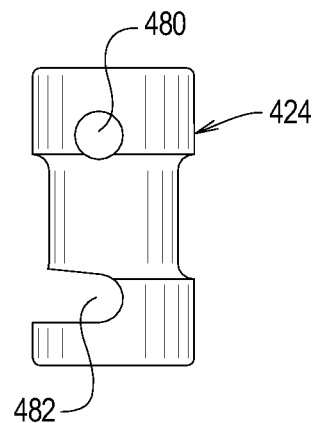
FIG. 27 is an elevation view of a bar part of the fourth example rope control device.

As perhaps best shown in FIG. 25, the main part 422 is an assembly of four different parts, while FIGS. 25 and 27 illustrate that the example bar part 424 is an integral part and not an assembly of parts.

In particular, the main part 422 defines first and second end members 470 and 472 and first and second side members 474 and 476. The first end member 470 defines first and second threaded cavities 470a and 470b, while the second end member 472 defines third and fourth threaded cavities 472a and 472b. The first side member 474 defines first and second threaded ends 474a and 474b, while the second side member 476 defines third and fourth threaded ends 476a and 476b. The threading of the opposite ends of the side members 474 and 476 are turned in opposite directions so that the end members 470 and 472 may be held in place and the side members rotated to thread the ends 474a, 474b, 476a, and 476b into the cavities 470a, 472a, 470b, and 472b, respectively. In particular, the first threaded cavity 470a is adapted to receive the first threaded end 474a, the second threaded cavity 470b is adapted to receive the third threaded end 476a, the third threaded cavity 472a is adapted to receive the second threaded end 474b, and the fourth threaded cavity 472b is adapted to receive the fourth threaded end 476b.

As perhaps best shown in FIG. 27, the bar part 424 defines an opening 480 and a notch 482. The opening 480 is sized and dimensioned to allow the first side member 474 to pass therethrough during assembly of the main part 422, thereby rotatably attaching the bar part 424 to the main part 422. The notch 482 is sized and dimensioned to receive the second side member 476 when the bar part 424 is in its engaged position.

The example rope control device 420 may be used in the same basic manner as the example rope control device 20 described above.

Figure 28:
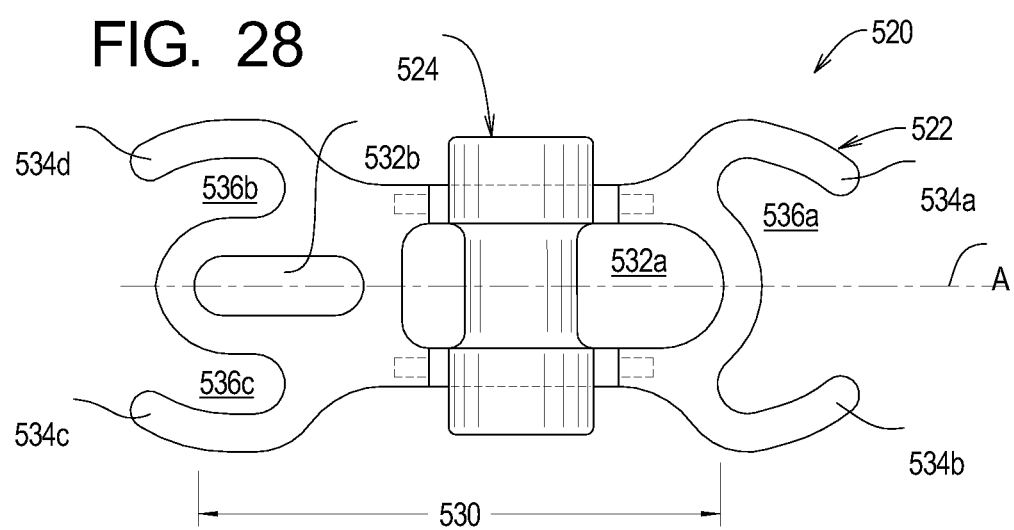
FIG. 28 is a top plan view of a fifth example rope control device.

Referring now to FIG. 28 of the drawing, depicted at 520 therein is another example rope control device constructed in accordance with, and embodying, the principles of the present invention. The rope control device 520 is an assembly comprising a main part 522 and a bar part 524. Like the bar part 24 described above, the bar part 524 is pivotably connected to the main part 522 for movement into and out of an engaged position.

The example main part 522 is an assembly comprising a central portion 530 defining a main opening 532a and a secondary opening 532b. However, like the main part 22 described above, the main part 522 may be made of a single cast or milled piece. The example main part 522 further comprises first, second, third, and fourth projection portions 534a, 534b, 534c, and 534d extending from the central portion 530. The first and second projection portions 534a and 534b define a first end recess 536a, while the third and fourth projection portions 534c and 534d and the main portion 530 define second and third end recesses 536b and 536c.

The example rope control device 520 may be used in the same basic manner as the example rope control device 20 described above. In addition, the provision of the secondary opening 532b and the second and third end recesses 536b allow uses of the rope control device 520 in addition to those allowed by the rope control device 20.

The scope of the present invention should thus be determined by claims appended hereto and not the foregoing detailed description of the example rope control device.

What is claimed is:

1. A rope control device for controlling a rope defining a first rope end, a second rope end, and first and second rope portions between the first and second rope ends, the rope control system comprising:
   a main part defining
      a central opening,
      first and second side portions,
      first and second end portions,
      first and second pairs of projection portions extending from the first and second end portions, respectively,
      a first notch defined by the first pair of projection portions, and
      at least a first end friction surface formed at a juncture of one projection portion of the first pair of projection portions and the first end portion; and
   a bar defining a bar notch; wherein
   the first side portion pivotably supports the bar for rotation between a first position in which the bar is not in contact the second side portion and a second position in which the bar notch receives the second side portion;
   the bar is arranged in the first position to allow the first rope portion to be extended through the central opening and at least partly around the bar; and
   the bar is arranged in the second position such that
      the main part and the bar define first and second opening portions of the central opening, and
      the first rope portion extends through the first and second opening portions and at least partly around the bar; and
   the second rope portion is passed through the first notch; and
   the second rope portion frictionally engages the first end friction surface when the rope is under tension.

2. A rope control device as recited in claim 1, in which the bar comprises a first bar portion and a second bar part, where the first and second bar parts are detachably attached to each other to allow the first side portion to extend through the bar opening.

3. A rope control device as recited in claim 2, in which the bar notch is formed in the first bar part.

4. A rope control device as recited in claim 1, in which the bar is hollow.

5. A rope control device as recited in claim 2, in which the first bar part is hollow.

6. A rope control device as recited in claim 1, in which: the main part defines a longitudinal axis;
the projections of the first and second pairs of projection portions each defines an intermediate portion and a distal portion;
the intermediate portion is substantially parallel with the longitudinal axis;
the end portion extends from the intermediate portion and is angled towards the longitudinal axis;
the first gap is formed between the end portions of the projection portions of the first pair of projection portions.

7. A rope control device as recited in claim 1, in which: the rope defines a third rope portion between the first and second rope ends;
a second notch is defined by the second pair of projection portions;
a first second end friction surface is formed at a juncture of one projection portion of the second pair of projection portions and the second end portion;
the third rope portion is passed through the second one gap without access to the first and second rope ends; and
the third rope portion frictionally engages the first second end friction surface when the rope is under tension.

8. A rope control device as recited in claim 1, in which: the rope defines a third rope portion between the first and second rope ends;
a second first end friction surface is formed at a juncture of one projection portion of the first pair of projection portions and the first end portion;
the third rope portion is passed through the first gap without access to the first and second rope ends; and
the second rope portion frictionally engages the second first end friction surface when the rope is under tension.

9. A rope control device as recited in claim 1, in which: a second notch is defined by the second pair of projection portions;
a second first end friction surface is formed at a juncture of one projection portion of the first pair of projection portions and the first end portion;
first and second end friction surfaces are formed at junctures of the projection portions of the second pair of projection portions and the second end portion.

10. A method of controlling movement of rope defining a first rope end,
a second rope end, and first and second rope portions between the first and second rope ends, the method comprising the steps of:
providing a main part defining a central opening, first and second side portions, first and second end portions, first and second pairs of projection portions extending the first and second end portions, respectively, first and second notches formed between the projection portions of the first and second pairs of projection portions, respectively, and a friction surface at junctures of the first and second end portions and each of the first and second pairs of projection portions adjacent extending therefrom; and
providing a bar defining a bar opening and a bar notch;
pivotably connecting the bar to the first side portion by extending the first side portion through the bar opening;
arranging the bar in a first position in which the bar is not in contact the second side portion to allow the first rope portion to be arranged within the central opening and at least partly around the bar without access to the first and second rope ends;
arranging the bar in a second position in which the bar notch receives the second side portion such that
the main part and the bar define first and second opening portions of the central opening, and
the first rope portion extends through the first and second opening portions and at least partly around the bar;
passing the second rope portion through at least one of the first notch and the second notch; and
placing the rope under tension such that the second rope portion frictionally engages one of the friction surfaces.

11. A method as recited in claim 10, in which the step of providing the bar comprises the steps of:
providing a first bar part;
providing a second bar part; and
detachably attaching the first and second bar parts to each other to allow the first side portion to extend through the bar opening.

12. A method as recited in claim 11, in which the bar notch is formed in the first bar part.

13. A method as recited in claim 10, in which the bar is hollow.

14. A method as recited in claim 11, in which the first bar part is hollow.

15. A method as recited in claim 10, in which at least one of the main part and the bar are made of titanium.

16. A rope control device for controlling defining a first rope end, a second rope end, and first and second rope portions between the first and second rope ends, the rope control device comprising:
a main part defining
a central opening,
first and second side portions,
first and second end portions,
first and second projection portions extending from the first end portion, where the first and second end portions define a first notch,
third and fourth projection portions extending from the second end portion, where the third and fourth end portions define a second notch, and
first, second, third, and fourth friction surfaces formed at junctures of the first end portion with the first projection portion, the first end portion with the second projection portion, the second end portion with the third projection portion, and the second end portion with the fourth projection portion, respectively; and
a bar comprising a first bar part and a second bar part, where the first bar part defines a bar notch; whereby
the second bar part is attached to the first bar part such that:
the first side portion extends through a bar opening to form the bar, and
the bar is pivotably connected to the first side portion for rotation between
a first position in which the bar is not in contact the second side portion and
a second position in which the bar notch receives the second side portion;
the bar is arranged in the first position to allow the first rope portion to be passed through the central opening and at least partly around the first bar part; and
the bar part is arranged in the second position such that the main part and the bar part define first and second opening portions of the central opening, and the first rope portion extends through the first and second opening portions and at least partly around the bar part;

the second rope portion is passed through one of the first and second notches; and the second rope portion frictionally engages at least one of the one of the first, second, third, and fourth end friction surfaces when the rope is under tension.

17. A rope control device as recited in claim 16, in which the bar is hollow.

18. A rope control device as recited in claim 16, in which the first bar part is hollow.

19. A rope control device as recited in claim 16, in which:

the main part defines a longitudinal axis;

the first, second, third, and fourth projections each defines an intermediate portion and a distal portion;

the intermediate portion is substantially parallel with the longitudinal axis; and the end portion extends from the intermediate portion and is angled towards the longitudinal axis.

20. A rope control device as recited in claim 16, in which at least one of the main part and the bar are made of titanium.

* * * * *